United States Patent
Joy et al.

(10) Patent No.: US 9,794,607 B2
(45) Date of Patent: Oct. 17, 2017

(54) AVB SYSTEM BANDWIDTH CONFIGURATION

(71) Applicant: Harman International Industries, Incorporated, Stamford, CT (US)

(72) Inventors: Lejin K. Joy, Bangalore (IN); Heramb Kuwelkar, Fatorda Margao (IN)

(73) Assignee: Harman International Industries, Incorporated, Stamford, CT (US)

( * ) Notice: Subject to any disclaimer, the term of this patent is extended or adjusted under 35 U.S.C. 154(b) by 43 days.

(21) Appl. No.: 14/584,938

(22) Filed: Dec. 29, 2014

(65) Prior Publication Data

US 2016/0191973 A1    Jun. 30, 2016

(51) Int. Cl.
| | |
|---|---|
| H04N 7/173 | (2011.01) |
| H04N 21/262 | (2011.01) |
| H04N 21/214 | (2011.01) |
| H04N 21/643 | (2011.01) |
| H04N 21/4363 | (2011.01) |
| H04N 21/647 | (2011.01) |
| H04N 21/61 | (2011.01) |
| H04N 21/2385 | (2011.01) |

(52) U.S. Cl.
CPC ..... *H04N 21/26216* (2013.01); *H04N 21/214* (2013.01); *H04N 21/4363* (2013.01); *H04N 21/615* (2013.01); *H04N 21/643* (2013.01); *H04N 21/64738* (2013.01); *H04N 21/2385* (2013.01)

(58) Field of Classification Search
CPC .................................. H04N 21/2385
USPC .......................................... 725/95
See application file for complete search history.

(56) References Cited

U.S. PATENT DOCUMENTS

| | | | | |
|---|---|---|---|---|
| 6,477,144 | B1* | 11/2002 | Morris | H04L 12/5602 370/230.1 |
| 2008/0288638 | A1* | 11/2008 | Diab | H04L 12/2805 709/225 |
| 2011/0096689 | A1* | 4/2011 | Sindhu | H04L 41/0896 370/252 |
| 2012/0314597 | A1* | 12/2012 | Singh | H04L 43/0882 370/252 |
| 2015/0131431 | A1* | 5/2015 | Gale | H04L 12/437 370/225 |

(Continued)

OTHER PUBLICATIONS

IEEE Standards Association, "Timing and Synchronization for Time-Sensitive Applications in Bridged Local Area Networks," IEEE Std 802.1AS-2011, Mar. 30, 2011, 292 pages.

(Continued)

*Primary Examiner* — Pankaj Kumar
*Assistant Examiner* — Sahar Baig
(74) *Attorney, Agent, or Firm* — McCoy Russell LLP

(57) ABSTRACT

Embodiments are disclosed for dynamically updating bandwidth allocations in an AVB communication system. In some embodiments, a device includes a communication interface communicatively connectable to at least one other device in a communication network and configured to transmit data via the communication network, a processor, and a storage device that stores instructions executable by the processor to detect an incoming data stream, and determine an amount of bandwidth to be used by the data stream. The instructions are further executable to update a bandwidth allocation for the data stream based on the determined amount of bandwidth.

20 Claims, 6 Drawing Sheets

(56) References Cited

U.S. PATENT DOCUMENTS

2015/0326441 A1* 11/2015 Smith ................. H04L 12/6418
370/255
2015/0363355 A1* 12/2015 Concer ................. G06F 15/167
709/214

OTHER PUBLICATIONS

IEEE Standards Association, "IEEE Standard for Layer 2 Transport Protocol for Time-Sensitive Applications in Bridged Local Area Networks," IEEE Std 1722-2011, May 6, 2011, 57 pages.
IEEE Standards Association, "Media Access Control (MAC) Bridges and Virtual Bridge Local Area Networks," IEEE Std 802.1Q-2011, Aug. 31, 2011, 1,365 pages (submitted in two parts).
IEEE Standards Association, "Audio Video Bridging (AVB) Systems," IEEE Std 802.1BA-2011, Sep. 30, 2011, 45 pages.

* cited by examiner

AVB SYSTEM BANDWIDTH CONFIGURATION

FIELD

The disclosure relates to managing AVB systems including configuring bandwidth in AVB devices.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In an AVB network, bandwidth for transmitted data streams may be a significant factor as large streams such as high definition video streams flow in a communication system. Current 802.1Qav protocol used in AVB networks provides an option to configure a fixed bandwidth at an intermediate network device ensuring the reserved bandwidth is available for a particular class of traffic. However, once reserved, the intermediate device does not adjust bandwidth allocations. The bandwidth reservations that are performed currently are statically defined and transferred into the switched network anytime the system is powered up. As ingress traffic may change throughout operation of the network device, some of the reserved bandwidth may be wasted over time (e.g., when incoming traffic is lighter than the reserved bandwidth allocation and therefore does not utilize all of the allocated bandwidth).

This disclosure provides systems and methods for dynamically changing the bandwidth based on ingress traffic. By dynamically updating the bandwidth allocation to different traffic queues in a bridge device, overall efficiency and throughput of the bridge device may be increased as some types of traffic are able to take advantage of bandwidth that is reserved for other types of traffic while the bandwidth is not being used by those other types of traffic.

In some embodiments, an example device for dynamically adjusting bandwidth allocations in an AVB communication system includes a communication interface communicatively connectable to at least one other device in a communication network and configured to transmit data via the communication network, a processor, and a storage device that stores instructions executable by the processor to detect an incoming data stream, and determine an amount of bandwidth to be used by the data stream. The instructions are further executable to update a bandwidth allocation for the data stream based on the determined amount of bandwidth.

In some embodiments, an example communication system includes a talker device including a transmission buffer for storing audio/video data blocks for transmission, and a communication interface configured to transmit packets via an AVB network. The example communication system further includes a listener device communicatively connected to the talker device and configured to receive the packets from the talker device, and an bridge device communicatively connected to the talker device and the listener device, the bridge device including a plurality of traffic queues, each traffic queue being associated with a different type of traffic. The bridge device further includes a storage device storing instructions executable by a processor of the bridge device to detect an incoming data stream from the talker device, identify a traffic type for the incoming data stream and assign the incoming data stream to a selected traffic queue of the plurality of traffic queues based on the identified traffic type, and determine an amount of bandwidth to be used by the incoming data stream. The instructions are further executable to update a bandwidth allocation for the selected traffic queue based on the determined amount of bandwidth to be used by the incoming data stream.

According to some embodiments, an example method for dynamically updating a bandwidth allocation for data streams flowing through a network device includes detecting, at the network device, an incoming data stream from a talker device in a communication network, determining one or more of a type and a class of traffic associated with the incoming data stream, determining an amount of bandwidth to be used by the data stream based on one or more data stream characteristics, and updating a bandwidth allocation for a selected traffic queue corresponding to one or more of the type and the class of traffic associated with the incoming data stream, the updated bandwidth allocation being based on the determined amount of bandwidth to be used by the data stream. The method further includes transmitting the data stream to a listener device in the communication network according to the updated bandwidth allocation via a port associated with the selected traffic queue.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a communication system may include talker and listener devices. Data streams transmitted between the talker and the listener may traverse an intermediate network device such as a bridge. Upon initial configuration of the bridge, different types/classes of traffic may be assigned different bandwidth allocations to ensure a quality of service requirement for the types/classes of traffic. However, during actual operation of the bridge, ingress traffic may vary, resulting in some types/classes of traffic occupying less bandwidth than reserved for that type/class of traffic. In the devices described below, ingress traffic may be monitored to detect such discrepancies between reserved and actual used bandwidth and update allocated bandwidth accordingly.

Figure 1:
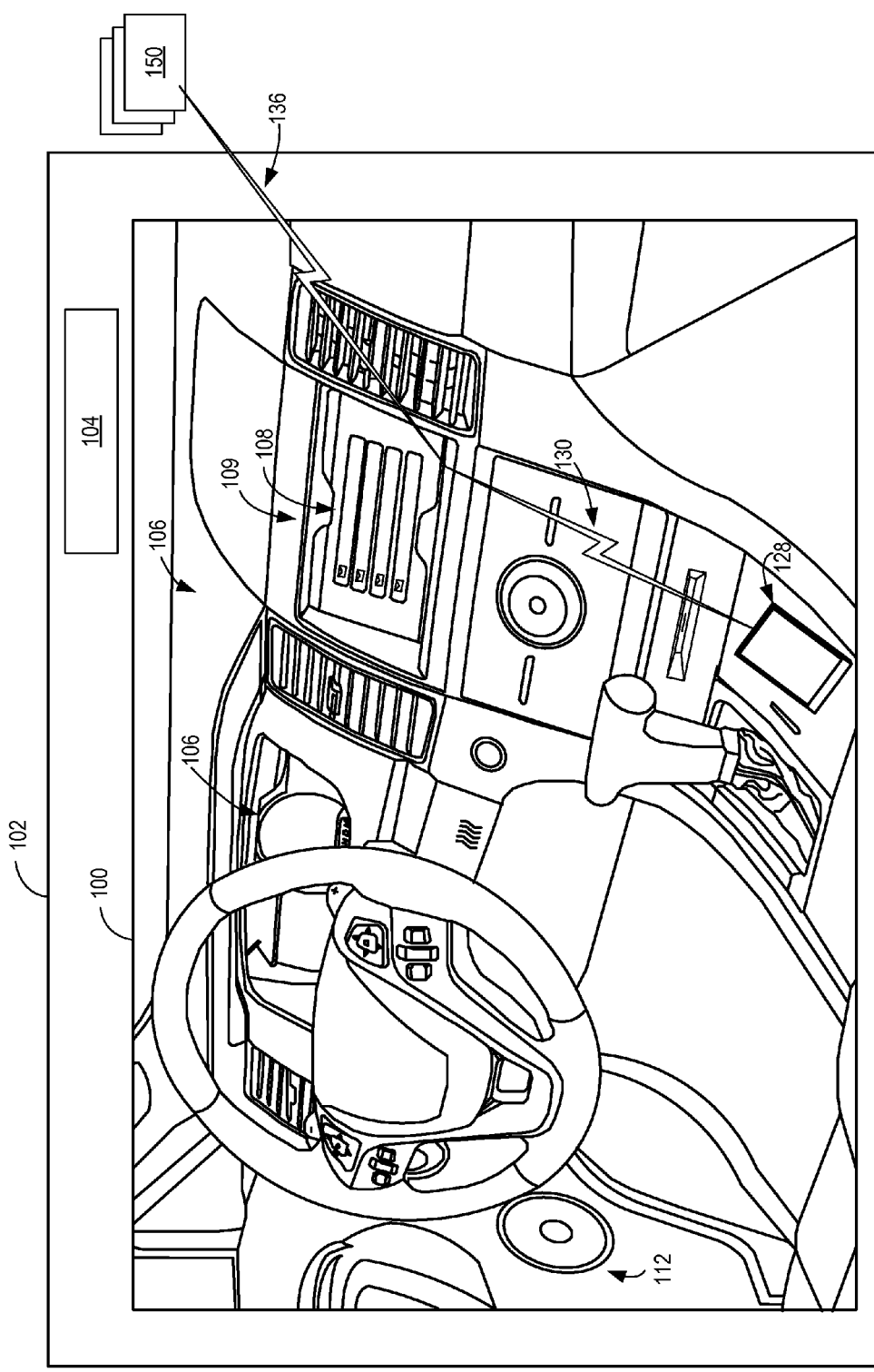
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34/IEEE 802.1Qav-2009 (Qav) for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 (audio/video transport protocol (AVTP)) related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Transmitting audio/video data having a proper number of sample chunks within each packet may ensure that the audio/video data is presenting via the speakers 112 and/or display 108 at a proper media rate (e.g., without audio distortions that may arise from samples being skipped or played too early/late).

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
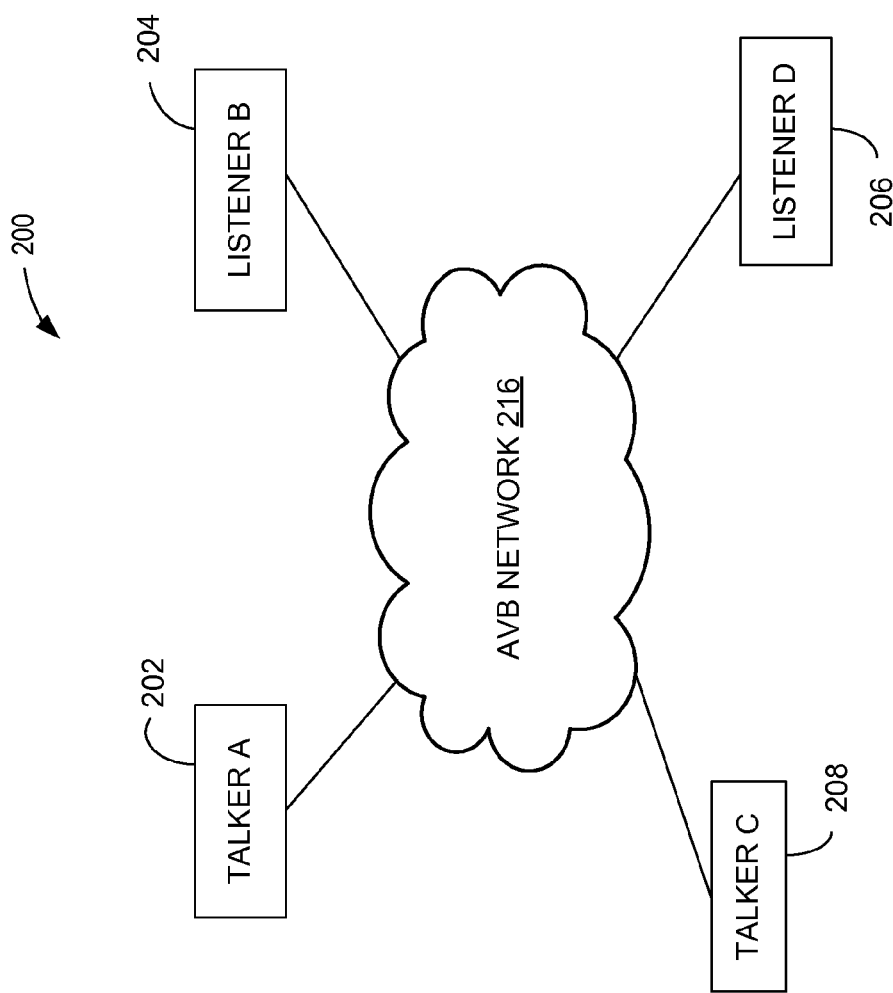
FIG. 2 shows an example communication system in accordance with one or more embodiments of the present disclosure.

FIG. 2 is an example communication system 200 including a plurality of talkers (e.g., talkers 202 and 208) and a plurality of listeners (e.g., listeners 204 and 206). As described above, each of the talkers may be any suitable device for sending an audio/video stream to one or more of the listeners. Each of the listeners may be any suitable device for receiving and playing back the audio/video stream received from one or more of the talkers. For example, talker 202 may correspond to in-vehicle computing system 109 and listener 204 may correspond to speakers 112 and/or display 108 of FIG. 1. Although illustrated as talkers/listeners/interface devices, it is to be understood that one or more devices in the communication system 200 (e.g., any of talkers/listeners/interface devices 202-210) may be configured to perform multiple roles. For example, one or more devices in the system may both transmit audio/video data and receive audio/video data, thereby selectively taking on the role of a talker and a listener. The role of the talker may be to transmit information and/or data across AVB network 216. Additionally or alternatively, the role of the talker may include establishing, creating, and/or reserving a connection for the transmission of a data stream carrying the information and/or data. Additionally or alternatively, the role of the talker may be to remove or tear down the connection. The role of the listener may be to receive the information and/or the data that has been sent over network 216. Additionally or alternatively, the role of the listener may include connecting to and/or reserving a connection to the data stream. Additionally or alternatively, the role of the listener may include removing a connection to the data stream. The role of the talker/listener may be to perform both the role of the talker and the listener, either at the same time or at different times.

The devices may also take on other roles, including but not limited to a client role, a controller, a master clock device, etc. The role of the controller may include controlling the flow of the data stream between the talker and the listener or the talker/listener. The controller may control the flow of the data stream by sending one or more messages to the talker, the listener, and/or the talker/listener to create a connection and/or remove the connection of the data stream between the talker and the listener or the talker/listener. The messages may be communicated to the talker, the listener, and/or the talker/listener through a high-level application layer of the talker, the listener, and/or the talker/listener. Additionally or alternatively, the role of the controller may be to identify and/or determine which of the talkers are of importance, relevant to, and/or expected to be used by a listener. The role of the client may include determining an input, such as a user input, indicative of the creation or the removal of the connection of the data stream and communicating the input to the controller. It is to be understood that additional or alternative devices may be present in communication system 200, including but not limited to bridges, switches, routers, and other suitable network devices. For example, one or more bridges and/or switches may be included in AVB network 216 to propagate messages between one or more talkers and one or more listeners in the system and/or to establish reservations for data streams between one or more talkers and one or more listeners in the system.

Figure 3:
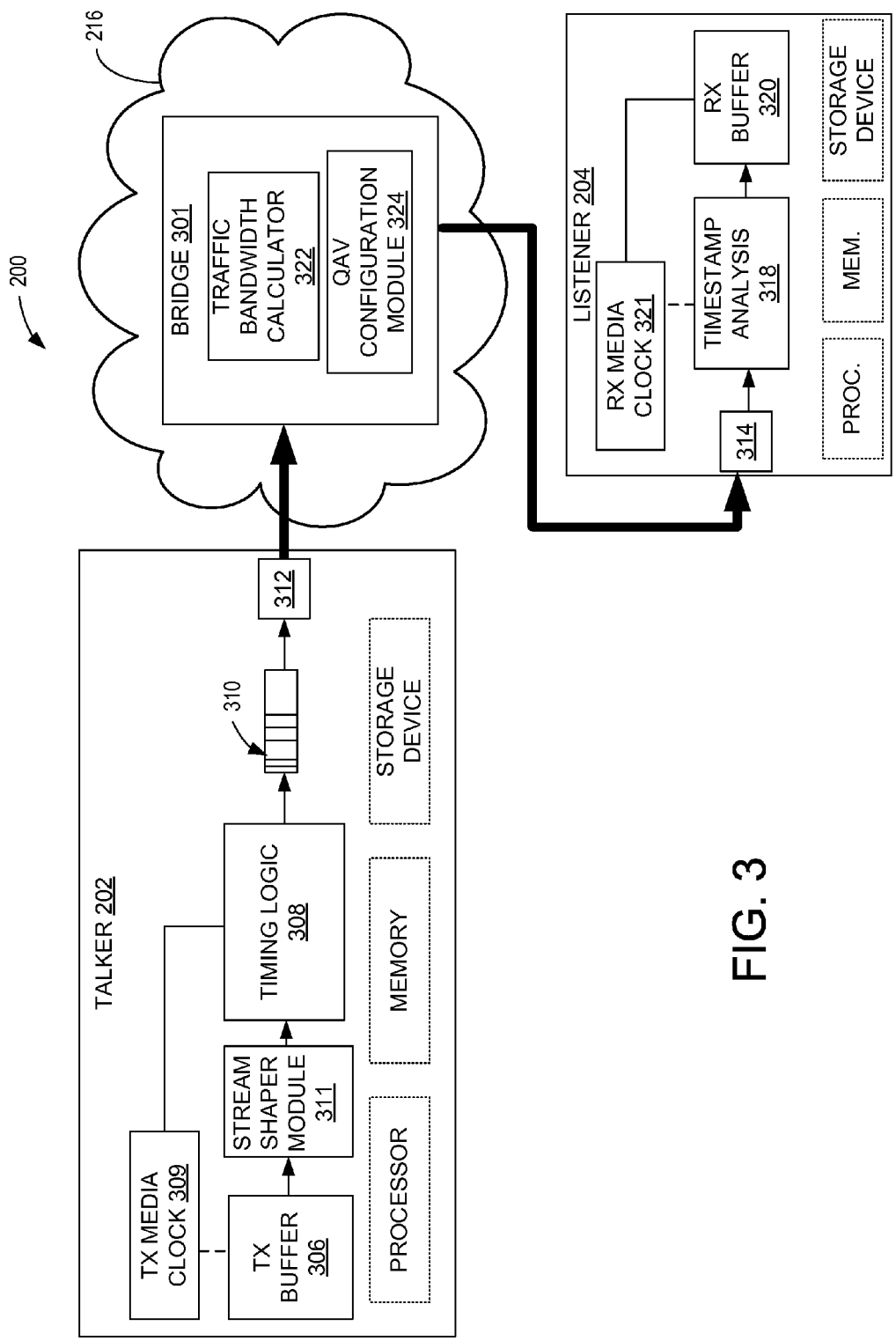
FIG. 3 shows an example configuration of network devices of the communication system of FIG. 2 in accordance with one or more embodiments of the present disclosure.
Figure 4:
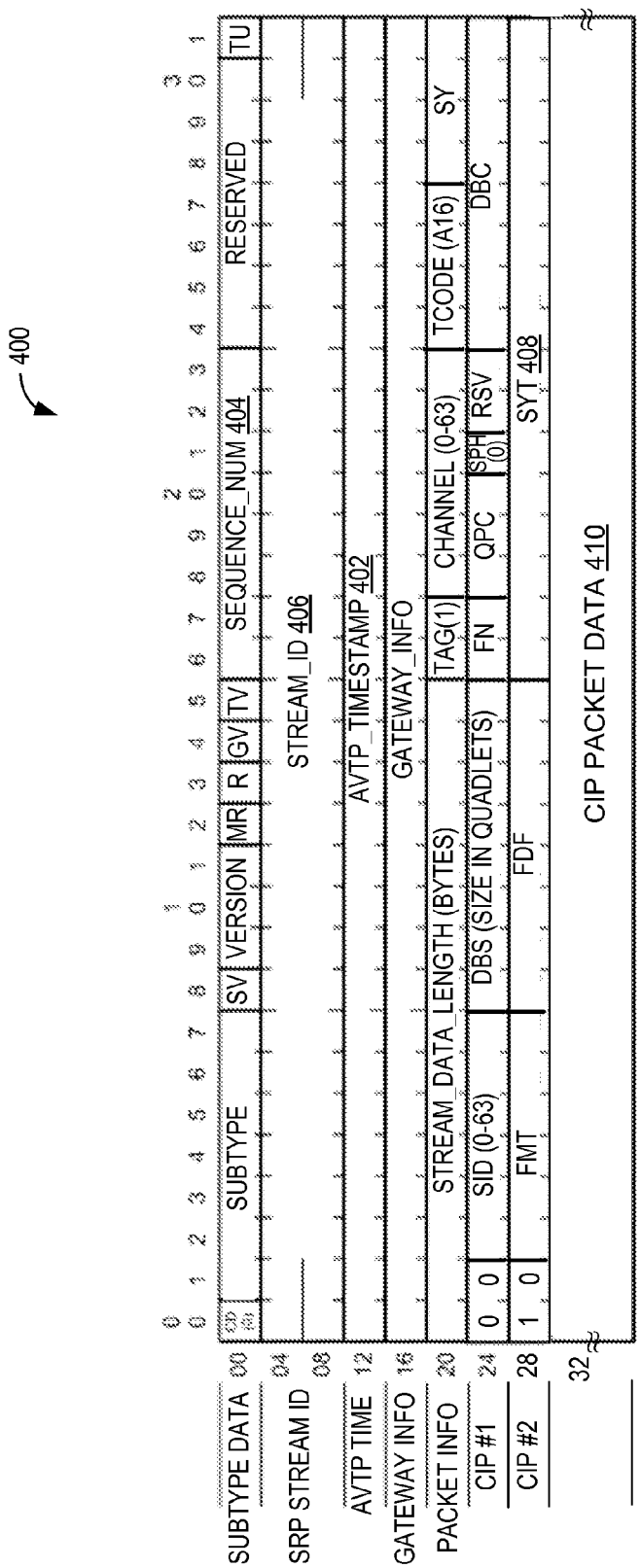
FIG. 4 shows an example packet structure in accordance with one or more embodiments of the present disclosure.

FIG. 3 illustrates an example configuration of talker 202 and listener 204 of FIG. 2. As illustrated, talker 202 may include a transmission buffer 306 configured to store data blocks of an audio/video stream. For example, if the audio/video stream is supplied from an external device (e.g., external device 150 and/or mobile device 128 of FIG. 1), the received data may be stored in transmission buffer 306 until the data is ready to be processed by a stream shaper module 311 and a timing logic module 308. Stream shaper module 311 (e.g., in combination with the timing logic 308 and/or another suitable module of talker 202, such as a packetizer, communication interface 312, etc.) may encapsulate one or more samples in a packet 310 including header information indicating a presentation time. An example packet structure is illustrated in FIG. 4 and described in more detail below.

Once stream shaper module 311 configures the samples for inclusion in the packet, the presentation time and/or other timestamps may be calculated and/or verified by timing logic 308. The presentation time may be calculated based on a clock signal from transmission media clock 309. The timing information used for calculating the presentation time may be determined by executing a precision time protocol (PTP) stack.

The packet 310 may be transmitted from talker 202 (e.g., via a talker communication interface 312) to a listener 204 (e.g., via a listener communication interface 314) over a network (e.g., an AVB network 216). For example, the packet 310 may be transmitted via bridge 301 within network 216. Accordingly, talker communication interface 312 and listener communication interface 314 may be configured to communicate via an AVB network (e.g., via the audio/video transport protocol, AVTP). Talker communication interface 312 and listener communication interface 314 may include one or more ports (e.g., ingress/egress ports for respectively receiving and transmitting messages via the network) communicatively connected to ports of bridge 301.

Bridge 301 may include, at the port level, traffic bandwidth calculator 322 and Qav configuration module 324 in order to continuously calculate the bandwidth from the ingress traffic (e.g., traffic received from talker 202) and configure the Qav traffic shaping parameters accordingly. For example, ingress traffic may be received and analyzed by traffic bandwidth calculator 322. Based on the analysis, traffic bandwidth calculator 322 may provide commands to the Qav configuration module 324 to adjust 802.11Q traffic shaping parameters to adjust to the dynamically changing traffic patterns. The traffic may be output at an egress port of bridge 301 to the destination (e.g., listener 204) in accordance with the adjusted Qav traffic shaping parameters. The dynamic bandwidth calculation and parameter adjustment will be described in more detail below with respect to FIG. 5. It is to be understood that one or more of the modules/processes included in and/or performed by bridge 301 may be included in and/or performed by other network devices, including but not limited to talker 202 and listener 204.

Packet 310, as received at listener 204, may be provided to a timestamp analysis module 318. Timestamp analysis module 318 may include instructions executable by a processor of listener 204 to evaluate the header of received packets (e.g., of packet 310) to determine a value of one or more timestamps in the header. The packet may be stored at receive buffer 320 in an index that is based on the presentation time included in the packet. The listener 204 may play out audio/video data from receive buffer 320 based on the index at which each data block is stored and/or when a receive media clock 321 of the listener reaches the presentation time indicated for a given data block.

In some examples, the presentation time may be utilized to synchronize the receive media clock 321 with the transmission media clock 309. For example, if the network delay (e.g., the max transit time) is known by both the talker and the listener, the listener may compare a receive time with an expected receive time (e.g., based on a known transmission delay and the presentation time) and adjust the receive media clock based on a calculated error (e.g., the difference between the measured receive time and the expected receive time).

Prior to sending packets for a data stream, talker 202 and listener 204 may perform a reservation routine to ensure that the network and associated pathways between the devices are able to support the data stream. When the talker determines to transmit a data stream, the talker may be configured to advertise the transmission as a Layer 2 advertisement message. The Layer 2 advertisement messages may be transmitted to reserve and establish network paths over at least one network (e.g., network 216) over which the data stream may be communicated. The advertisement messages may include one or more talker attributes including but not limited to talker identifiers, listener identifiers, a type of transmission (e.g., unicast, multicast, broadcast, etc.), destination addresses (e.g., Layer 2 or MAC addresses), stream identifiers (e.g., a unique sequence of characters and/or numbers which may be assigned to only one data stream or otherwise attributable to a particular individual data stream), quality of service parameters, and/or other characteristics about the talker and/or the data stream being advertised.

One or more listeners may receive the advertisement messages and determine whether to receive the data stream being advertised. For example, the listeners may be configured to assign and/or identify the stream ID to determine whether the listener is to receive the data stream. If the data stream is to be received, the listener may register or store the Layer 2 advertisement message and/or the talker attributes. The listener may send a response (e.g., a Layer 2 ready message) indicating that the listener has determined to receive the data stream if such a determination is made. The ready message may include listener attributes (e.g., the stream ID of the data stream for comparison at a receiving talker device) for requesting receipt of the data stream being advertised. In response to receiving the ready message at the talker device that sent the advertise message, the talker device may register or store the ready message and/or the included listener attributes. In addition, the reservation and/or establishment of the data path may be completed responsive to receipt of the ready message. The reservation may include a reservation for resources and/or QoS parameters, such as bandwidth, that were identified in the Layer 2 advertisement message. In some examples, multiple paths may be reserved and/or established responsive to receipt of one or more ready messages.

Once a reservation for one or more network paths is complete and the Layer 2 advertisement and ready messages and associated talker and listener attributes are registered, the data stream may be communicated between the talker and the one or more listeners. After the communication of the data stream has ended, the talker and the one or more listeners may be configured to communicate Layer 2 termination messages to terminate the communication. In response to the Layer 2 termination messages, the reservations for the network paths may be terminated, the registrations of the Layer 2 advertisement messages, responses, and associated talker attributes may be de-registered, and any resources consumed for communication of the data stream may be made available for other communications of data streams.

It is to be understood that one or more of the components of talker 202 and listener 204 may include and/or be included in a processor and/or storage device of talker 202 and listener 204. For example, although a processor/memory/storage device is illustrated separately within talker 202 and listener 204, it is to be understood that transmission buffer 306 may include at least a portion of a storage device of talker 202, and timing logic 308 may include instructions stored in the storage device of talker 202 and/or a processor for executing the instructions stored in the storage device of talker 202. Likewise, receive buffer 320 may include at least a portion of a storage device of listener 204, and timestamp analysis module 318 may include instructions stored in the storage device of listener 204 and/or a processor for executing the instructions stored in the storage device of listener 204.

FIG. 4 illustrates an example packet 400 including a presentation time (e.g., AVTP_TIMESTAMP field 402). For example, packet 400 may illustrate an example structure of packet 310 of FIG. 3. Other fields of note may include the SEQUENCE_NUM field 404, which may indicate a place of the packet in the audio/video stream (e.g., how many packets were sent before that packet in the current audio/video stream). STREAM_ID field 406 may indicate an identifier for the stream, which designates the stream to which the packet belongs. As described above, AVTP_TIMESTAMP field 402 indicates a time at which the packet is to be played back (e.g., a real time and/or a time that is reachable by a media clock of a listener). SYT field 408 may indicate a SYT_INTERVAL, which denotes the number of data blocks between two successive valid AVTP_TIMESTAMP fields. CIP PACKET DATA field 410 may include the payload of the packet (e.g., while each of the other fields illustrated in FIG. 4 and/or described above make up the header of the packet). For example, CIP PACKET DATA field 410 may include the audio/video data blocks/samples to be played back at the time indicated in the AVTP_TIMESTAMP field 402.

Figure 5:
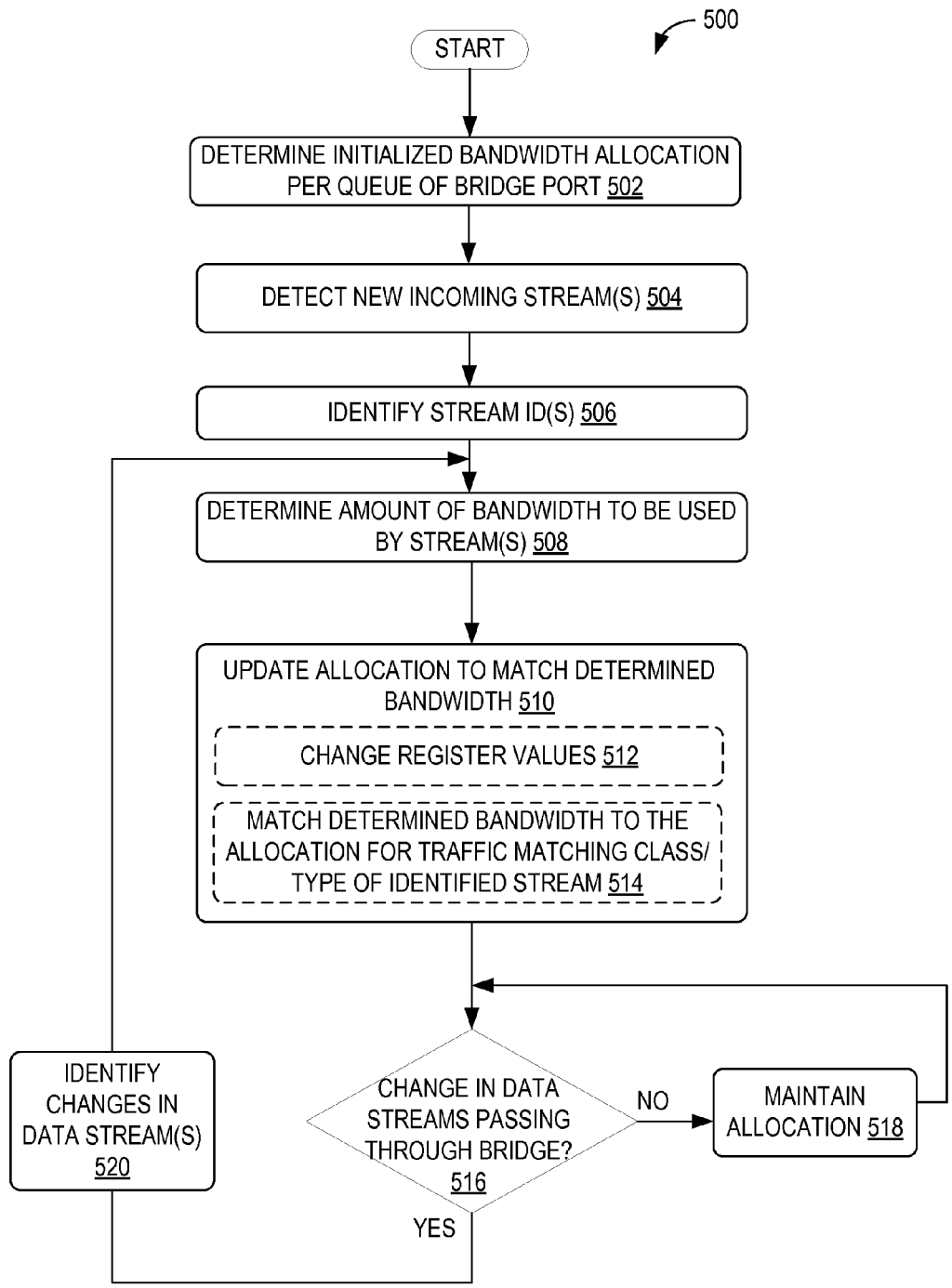
FIG. 5 is a flow chart for an example method of dynamically adjusting bandwidth allocations in accordance with one or more embodiments of the present disclosure.

FIG. 5 is a flow chart of a method 500 for dynamically adjusting bandwidth allocations on queues of a bridge in a communication system, such as bridge 301 of communication system 200 of FIG. 3. At 502, method 500 includes determining an initialized bandwidth allocation for each queue supported by a port of the bridge. For example, each port of a bridge may provide a traffic queue through which traffic flows. Accordingly, each bridge may support one or more queues. The queues may be organized by traffic class and/or type. For example, one queue of a bridge may be configured for AVB traffic, while another may be configured for other best effort traffic. In some examples, a different queue may be provided for each class of data (e.g., class A AVB data streams may be assigned to a first queue of a bridge, class B AVB data may be assigned to a second queue of the bridge, and best effort traffic may be assigned to a third queue of the bridge). During initial configuration of the bridge, an initialized bandwidth may be allocated to each queue. The initialized bandwidth may be a percentage of available bandwidth and/or reserved bandwidth through the bridge. For example, 70% of the available bandwidth may be allocated to AVB traffic, while 30% of the available bandwidth may be allocated to normal best effort traffic.

At 504, the method includes detecting a new incoming stream (e.g., entering an ingress port of the bridge). At 506, the method includes identifying a stream ID for the new incoming stream. Based on the stream ID and/or other information available for the stream, the bridge may determine the amount of bandwidth to be used by the stream, as indicated at 508. A more detailed example of calculating the amount of bandwidth to be used by the stream is described below with respect to FIG. 6.

At 510, the method includes updating the bandwidth allocation for one or more traffic queues of the bridge to match the determined bandwidth. As indicated at 512, updating the allocation may include changing register values indicating the percentage of bandwidth to be reserved for each queue. Updating the allocation may include matching or setting the bandwidth determined at 508 to the bandwidth allocated for traffic matching the class/type of the identified stream, as indicated at 514. As an example, the initialized bandwidth allocations described above of 70% of the bandwidth being allocated to AVB traffic and 30% to best effort may be applied to the queues of an example bridge. If an incoming stream (or if the sum of data from all incoming streams) is identified as using 45% of the available bandwidth, the updated allocation may adjust the bandwidth allocation for the AVB queue to 45% and the bandwidth allocation for best effort traffic to 55%. In this way, both the allocated bandwidth for the queue associated with the incoming data stream (e.g., the queue serving traffic having a type and/or class that matches the type and/or class of the incoming data stream) and the allocated bandwidth for another queue may be updated based on the determined amount of bandwidth to be used by the incoming data stream. In some examples, the remaining bandwidth after allocating bandwidth the queue(s) associated with the incoming data stream(s) may be evenly split among remaining queues. In other examples, the remaining bandwidth may be applied to remaining queues according to a pre-defined ratio or other suitable function (e.g., based on current operating conditions/network status).

At 516, the method includes determining if a change in the data stream(s) passing through the bridge has occurred. For example, a change may include a termination of one or more streams, an addition of one or more streams, and/or a change in a parameter of one or more streams. If a change is not detected (e.g., "NO" at 516), the method proceeds to 518 to maintain the current bandwidth allocation, and continue monitoring for changes in the streams. If a change is detected (e.g., "YES" at 516), the method proceeds to 520 to identify changes in the data stream(s) and return to 508 to determine an amount of bandwidth to be used by the streams passing through the bridge. Using the example above, if one or more streams are terminated, thereby lowering the total bandwidth used by AVB traffic to 20%, the allocation may be updated to reflect such changes (e.g., 20% of the bandwidth may be reserved for the AVB traffic queue, while 80% of the bandwidth may be occupied by best effort traffic). In this way, the updates may be continuously applied. It is to be understood that the system may check for data stream changes continuously (e.g., repeating 516 until a change is detected, with only processing delays contributing to the length of each iteration and/or as an interrupt routine in which the system proceeds to 520 responsive to a signal indicating a change in incoming data streams) and/or periodically (e.g., the determination at 516 may be performed responsive to a timed trigger). The system may alter the way in which data stream changes are checked based on operating conditions. For example, the system may check for data stream changes more frequently when total traffic is higher than a threshold and/or when an allocation for AVB traffic is lower than a threshold and less frequently during opposite conditions.

Figure 6:
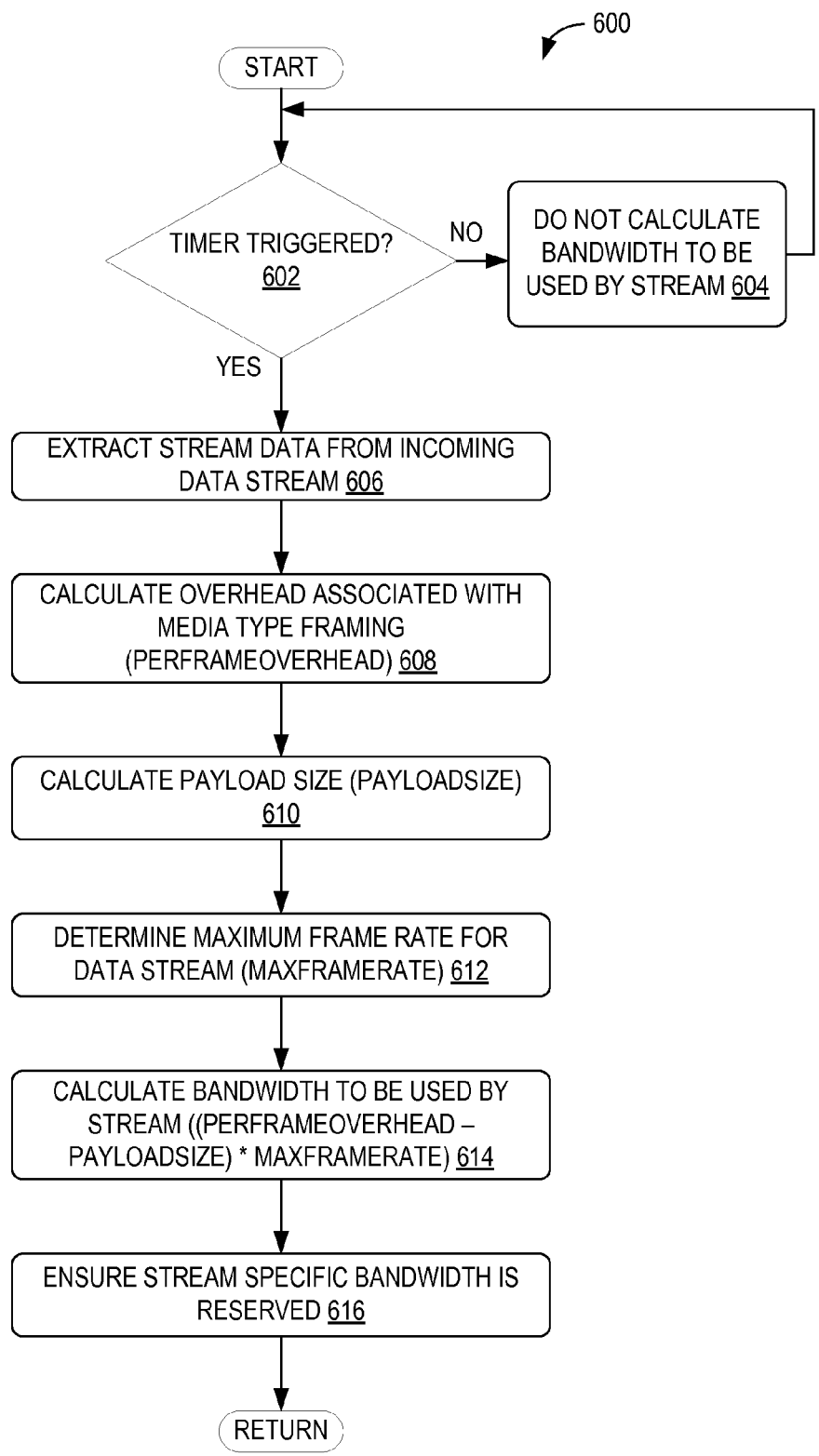
FIG. 6 is a flow chart for an example method of calculating an amount of bandwidth to be used by a data stream in accordance with one or more embodiments of the present disclosure.

FIG. 6 is a flow chart of a method 600 for determining an amount of bandwidth to be used by an incoming data stream. For example, method 600 may be performed by a module of a bridge device in a network, such as traffic bandwidth calculator 322 of FIG. 3. At 602, the method includes determining if a timer has triggered the calculation of bandwidth to be utilized by a data stream. For example, data stream bandwidth usage calculations may be performed periodically and/or responsive to an event-based trigger that may be detected at 602. If no trigger is detected (e.g., "NO" at 602), the method proceeds to 604 to not calculate the bandwidth to be used by the stream and returns to check for the trigger at a later time. If a trigger is detected (e.g., "YES" at 602), the method proceeds to 606 to extract stream data from one or more incoming data streams. For example, stream data including packet header information (e.g., preamble, start of frame delimiter, destination address, source address, 802.1 Qtag, Ethertype, frame check sequence, inter frame gap, and/or other suitable header information) and stream information (e.g., stream ID, VLAN ID, priority, accumulated latency, and/or other stream information) may be extracted from one or more packets of the incoming data stream.

At 608, the method includes calculating an overhead associated with the media type framing (e.g., a PerFrameOverhead). For example, the overhead may represent the total amount of data included in headers and/or other non-payload data of each packet of the packet stream and/or a total of such data estimated to pass through the bridge per unit time. At 610, the method includes calculating the payload size (e.g., a PayloadSize). The payload size may be the total amount of data in a payload of each packet of the data stream and/or the total of all payloads estimated to pass through the bridge per unit time. At 612, the method includes determining a maximum frame rate for the data stream (e.g., a MaxFrameRate).

At 614, the method includes calculating the bandwidth to be used by the stream. For example, the bandwidth to be used may be equal to the MaxFrameRate multiplied by the difference of the PerFrameOverhead and the PayloadSize. As indicated at 616, the method includes ensuring that stream specific bandwidth is reserved by extracting the stream ID, VLAN ID, priority, accumulated latency, and other stream information and adjusting the calculated bandwidth to ensure that the reserved bandwidth is met but not exceeded. In other words, the calculated bandwidth may be truncated by the reserved bandwidth such that the updated bandwidth does not exceed the reserved bandwidth for the traffic queue associated with the incoming data stream. For example, if a flood of incoming AVB traffic is received, automatically setting the bandwidth allocation to the amount of bandwidth to be used by the incoming AVB traffic may result in the AVB traffic occupying more bandwidth than initially allocated (thereby infringing on the guaranteed best effort traffic reservation). By placing an upper bound on the calculated bandwidth that corresponds to the initially reserved bandwidth for AVB traffic, such a situation may be avoided. The calculated bandwidth may be utilized to update the allocation as indicated at 510 in FIG. 5.

The static bandwidth allocation at typical bridge devices may cause bandwidth to be wasted when real-time traffic is lower than a reserved amount. By dynamically updating the bandwidth allocation to different traffic queues in a bridge device, bandwidth that is initially reserved but ultimately unused may be used for other traffic, thereby increasing the overall efficiency and throughput of the bridge device.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or talker 202/listener 204/bridge 301 described with reference to FIGS. 1-3. The methods may be performed by executing stored instructions with one or more logic devices (e.g., processors) in combination with one or more additional hardware elements, such as storage devices, memory, hardware network interfaces/antennas, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device comprising:
  a communication interface communicatively connectable to at least one other device in a communication network via one or more ports and configured to transmit data via the communication network, each of the one or more ports supporting one or more traffic queues;
  a processor; and
  a storage device that stores instructions executable by the processor to:
    detect an incoming data stream;
    determine an amount of bandwidth to be used by the data stream;
    update a bandwidth allocation for at least one of the traffic queues based on the determined amount of bandwidth;
    determine if a change in at least one data stream passing through the device is detected;
    if the change is not detected, maintain the updated bandwidth allocation for the traffic queue; and
    if the change is detected, identify a changed data stream passing through the device and determine a further updated bandwidth allocation for a further selected traffic queue corresponding to one or more of a type and a class of traffic associated with the changed data stream.

2. The device of claim 1, wherein the device is a bridge device in the communication network, wherein the communication network is an AVB network, and wherein updating the bandwidth allocation includes updating the bandwidth allocation for each traffic queue of each of the one or more ports.

3. The device of claim 1, wherein the amount of bandwidth to be used by the data stream is based on a calculated overhead associated with media type framing of data in the data stream and a payload size of data in the data stream.

4. The device of claim 3, wherein the amount of bandwidth to be used by the data stream is further based on a maximum frame rate for data in the data stream.

5. The device of claim 1, wherein detecting the incoming data stream comprises detecting a timer trigger indicating a change in data flowing into the device.

6. The device of claim 1, wherein the instructions are further executable to determine a stream type associated with the incoming data stream, and wherein updating the bandwidth allocation for the at least one of the traffic queues comprises matching the bandwidth allocation for the at least one of the traffic queues to the determined amount of bandwidth to be used by the data stream.

7. The device of claim 6, wherein determining the stream type comprises identifying a stream ID for the incoming data stream, and wherein the bandwidth allocation for each of the one or more traffic queues is based on a total available bandwidth.

8. The device of claim 1, wherein each traffic queue of the at least one traffic queues corresponds to a different type of traffic or a different class of data.

9. The device of claim 8, wherein updating the bandwidth allocation for the data stream comprises changing register values in the device to indicate a percentage of bandwidth to be allocated to the traffic queue of the device that corresponds to a type of traffic matching the incoming data stream.

10. A communication system comprising:
a talker device including:
a transmission buffer for storing audio/video data blocks for transmission, and
a communication interface configured to transmit packets via an AVB network;
a listener device communicatively connected to the talker device and configured to receive the packets from the talker device; and
a bridge device communicatively connected to the talker device and the listener device, the bridge device including one or more ports, each port supporting at least one of a plurality of traffic queues, each traffic queue being associated with a different type of traffic, the bridge device including a storage device storing instructions executable by a processor of the bridge device to:
detect an incoming data stream from the talker device,
identify a traffic type for the incoming data stream and assign the incoming data stream to a selected traffic queue of the plurality of traffic queues based on the identified traffic type,
determine an amount of bandwidth to be used by the incoming data stream,
update a bandwidth allocation for the selected traffic queue based on the determined amount of bandwidth to be used by the incoming data stream,
determine if a change in at least one data stream passing through the bridge device is detected,
if the change is not detected, maintain the updated bandwidth allocation for the selected traffic queue, and
if the change is detected, identify a changed data stream passing through the bridge device and determine a further updated bandwidth allocation for a further selected traffic queue corresponding to one or more of a type and a class of traffic associated with the changed data stream.

11. The system of claim 10, wherein the instructions are further executable to update a bandwidth allocation for one or more other traffic queues of the plurality of traffic queues based on the determined amount of bandwidth to be used by the incoming data stream.

12. The system of claim 10, wherein the determined amount of bandwidth to be used by the data stream is based on a calculated overhead associated with media type framing of data in the data stream and a payload size of data in the data stream.

13. The system of claim 12, wherein the amount of bandwidth to be used by the data stream is further based on a maximum frame rate for data in the data stream.

14. The system of claim 13, wherein the amount of bandwidth to be used by the data stream is adjusted such that the updated bandwidth allocation does not exceed a reserved bandwidth for the selected traffic queue.

15. The system of claim 10, wherein updating the bandwidth allocation for the selected traffic queue comprises changing register values in the bridge device to indicate a percentage of bandwidth to be allocated to the selected traffic queue.

16. The system of claim 10, wherein updating the bandwidth allocation comprises adjusting traffic shaping parameters according to IEEE 802.1Qav.

17. A method for dynamically updating a bandwidth allocation for data streams flowing through a network device, the method comprising:
detecting, at the network device, an incoming data stream from a talker device in a communication network;
determining one or more of a type and a class of traffic associated with the incoming data stream;
determining an amount of bandwidth to be used by the data stream based on one or more data stream characteristics;
updating a bandwidth allocation for a selected traffic queue of a plurality of traffic queues supported by the network device, the selected traffic queue corresponding to one or more of the type and the class of traffic associated with the incoming data stream, the updated bandwidth allocation being based on the determined amount of bandwidth to be used by the data stream;
transmitting the data stream to a listener device in the communication network according to the updated bandwidth allocation via a port associated with the selected traffic queue;
determining if a change in at least one data stream passing through the network device is detected;
if the change is not detected, maintaining the updated bandwidth allocation for the selected traffic queue; and
if the change is detected, identifying a changed data stream passing through the network device and determining a further updated bandwidth allocation for a further selected traffic queue corresponding to one or more of a type and a class of traffic associated with the changed data stream.

18. The method of claim 17, wherein the amount of bandwidth to be used by the data stream is based on a calculated overhead associated with media type framing of data in the data stream, a payload size of data in the data stream, and a maximum frame rate for data in the data stream.

19. The method of claim 17, wherein updating the bandwidth allocation for the data stream comprises changing register values in the network device to indicate a percentage of bandwidth to be allocated to the selected traffic queue.

20. The method of claim 17, wherein updating the bandwidth allocation comprises adjusting traffic shaping parameters according to IEEE 802.1Qav.

* * * * *